United States Patent
Kodera (10) Patent No.: US 8,887,781 B2
(45) Date of Patent: Nov. 18, 2014

(54) VACUUM ADSORPTION CONTROL MECHANISM DEVICE, FILM PASTING DEVICE, METHOD OF PASTING FILM, AND DISPLAY DEVICE

(75) Inventor: Hideki Kodera, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 381 days.

(21) Appl. No.: 12/675,575

(22) PCT Filed: Aug. 20, 2008

(86) PCT No.: PCT/JP2008/065227
§ 371 (c)(1),
(2), (4) Date: Mar. 30, 2010

(87) PCT Pub. No.: WO2009/031441
PCT Pub. Date: Mar. 12, 2009

(65) Prior Publication Data
US 2010/0206485 A1    Aug. 19, 2010

(30) Foreign Application Priority Data

Sep. 4, 2007    (JP) ................. 2007-228892

(51) Int. Cl.
| B65C 9/00 | (2006.01) |
| B65H 37/04 | (2006.01) |
| B29C 63/02 | (2006.01) |
| B32B 38/18 | (2006.01) |
| B32B 37/00 | (2006.01) |
| G02F 1/13 | (2006.01) |
| G02F 1/1335 | (2006.01) |

(52) U.S. Cl.
CPC .............. B65H 37/04 (2013.01); B29C 63/024 (2013.01); B32B 38/1858 (2013.01); B32B 37/0053 (2013.01); B32B 2457/20 (2013.01); B65H 2406/3314 (2013.01); B65H 2406/361 (2013.01); B65H 2701/1752 (2013.01); B65H 2801/61 (2013.01); G02F 1/1303 (2013.01); G02F 1/133528 (2013.01); B65H 2406/3612 (2013.01)

USPC .......... 156/446; 156/215; 156/256; 156/285; 156/448; 156/556; 156/568

(58) Field of Classification Search
USPC .......... 156/215, 256, 285, 448, 556, 568, 446
See application file for complete search history.

(56) References Cited

U.S. PATENT DOCUMENTS

RE30,419 E  *  10/1980   Crankshaw et al. .......... 156/249
5,964,974 A  *  10/1999   Hinton .......................... 156/215
(Continued)

FOREIGN PATENT DOCUMENTS

| CN | 1447161 A | 10/2003 |
| JP | 42-21656 | 10/1967 |

(Continued)

OTHER PUBLICATIONS

International Search Report, PCT/JP2008/065227, Nov. 11, 2008.
(Continued)

Primary Examiner — Christopher Schatz
(74) Attorney, Agent, or Firm — Young & Thompson (57) ABSTRACT

An object of the present invention is to provide a vacuum suction control mechanism apparatus capable of accurately bonding a film to a bonding object with a simple structure. A vacuum suction control mechanism apparatus according to the present invention includes a first member including a plurality of suction holes formed in a surface thereof, the plurality of suction holes being connectable to a decompression source, and a second member capable of contacting the plurality of suction holes, the second member being movable relative to the first member, wherein the second member includes connecting member connecting some of the suction holes, the number of which corresponds to a relative position between the first member and the second member, to the decompression source.

11 Claims, 12 Drawing Sheets

(56) References Cited

U.S. PATENT DOCUMENTS 6,591,886 B1 * 7/2003 Gonzalo .................. 156/566
2003/0218713 A1 11/2003 Suzuki et al.

FOREIGN PATENT DOCUMENTS

| | | |
|---|---|---|
| JP | 61-199926 | 9/1986 |
| JP | 62-59660 | 4/1987 |
| JP | 2001-042315 | 2/2001 |
| JP | 2002-014359 | 1/2002 |
| JP | 2003-022029 | 1/2003 |

OTHER PUBLICATIONS

Japanese Official Action—2007-228892—Jan. 16, 2013.
Chinese Office Action dated Sep. 18, 2012 issued by the Chinese Patent Office in corresponding Chinese Patent Application No. 200880104980.2 with partial translation, 7 pages.

* cited by examiner

VACUUM ADSORPTION CONTROL MECHANISM DEVICE, FILM PASTING DEVICE, METHOD OF PASTING FILM, AND DISPLAY DEVICE

BACKGROUND ART

The present invention relates to a vacuum suction control mechanism apparatus, a film bonding apparatus comprising a vacuum suction mechanism, a film bonding method using a film bonding apparatus, and a display apparatus manufactured by a film bonding method.

A display apparatus using liquid crystal or the like is formed by filling liquid crystal or the like between a pair of substrates such as glasses comprising electrodes for display and bonding a polarization film on a surface of one of the substrates.

Apparatuses for bonding a film on a substrate comprise various types of structures. Some apparatuses use a bonding unit (bonding head) comprising suction holes formed in a surface thereof as shown in Patent Document 1.

Specifically, as described at paragraph [0028] of Japanese laid-open patent publication No. 2001-42315 (Patent Document 1), a suction surface of a film support 22, which comprises a curved shape, is formed by a plate comprising a plurality of suction holes defined therein. Suction valves are connected to the suction holes.

As described at paragraph [0037], the film support 22 is rotated and moved toward a supply device A, which supplies a film. The suction valves are switched so as to exhaust air through the suction holes, thereby attracting the film.

After the attraction of the film, the film support 22 is rotated and moved above a substrate (liquid crystal panel). Then the film is bonded to the substrate.

Thereafter, the suction valves are switched so as to supply air, thereby releasing the suction. Thus, the film support 22 is separated from the substrate.

Furthermore, as described at paragraph [0046], air is blown to the film at the time of the bonding in order to prevent a positional deviation when the film is bonded to the substrate.

DISCLOSURE OF INVENTION

However, in a mechanism thus using vacuum suction to bond a film, suction of a suction hole is controlled with a suction valve. Therefore, it is necessary to provide valves so as to correspond to the number of the suction holes. Thus, the structure is problematically complicated.

Furthermore, a structure for blowing air at the time of attraction or bonding complicates the structure of an apparatus. Moreover, the air blow may cause dust or air to be mixed on a bonding surface. Thus, there is a problem that the bonding accuracy may be lowered.

The present invention has been made in view of the above problems. It is an object of the present invention to provide a vacuum suction control mechanism apparatus capable of accurately bonding a film to a bonding object with a simple structure.

In order to achieve the aforementioned object, a first invention provides a vacuum suction control mechanism apparatus comprising: a first member comprising a plurality of suction holes formed in a surface thereof, the plurality of suction holes being connectable to a decompression source; and a second member capable of contacting the plurality of suction holes, the second member being movable relative to the first member, wherein the second member includes connecting member connecting some of the suction holes, the number of which corresponds to a relative position between the first member and the second member, to the decompression source.

A second invention provides a film bonding apparatus comprising the vacuum suction control mechanism apparatus according to the first invention.

A third invention provides a film bonding method comprising: bonding a film to a bonding object with use of the film bonding apparatus according to the second invention.

A fourth invention provides a display apparatus manufactured by bonding a film to a bonding object with use of the film bonding method according to the third invention.

EFFECTS OF THE INVENTION

According to the present invention, there can be provided a vacuum suction control mechanism apparatus capable of accurately bonding a film to a bonding object with a simple structure.

DESCRIPTION OF REFERENCE NUMERALS

1 Film bonding apparatus
3 Bonding head
3a End face
3b Surface
3c Head shaft hole
5 Base member
5a Base shaft hole
7 Shaft
9 Suction portion
9a Suction hole
11 Groove
13 Hole
15 Bonding surface plate
17 Film
19 Glass substrate
19a Mount 23 Piece
25 Polarization plate
26 Liquid crystal panel
27 Display apparatus

BEST MODE FOR CARRYING OUT THE INVENTION

A preferred embodiment of the present invention will be described below with reference to the drawings.

First, an arrangement of a film bonding apparatus 1 according to an embodiment of the present invention will be described with reference to FIGS. 1 to 3C.

Here, the film bonding apparatus 1 is illustrated as an example of a film bonding apparatus for bonding a film of a flexible polarization film to a bonding object of a glass substrate for a liquid crystal panel.

As shown in FIGS. 1 to 3A, the film bonding apparatus 1 as a vacuum suction control mechanism apparatus comprises a bonding head 3, a base member 5, a shaft 7, and a bonding surface plate 15.

As shown in FIGS. 1 to 3A, the film bonding apparatus 1 includes, as a first member, the cylindrical bonding head 3 for attracting a film 17, which will be described later. The diameter of the bonding head 3 is selected properly depending upon the dimension of the film 17.

Figure 1:
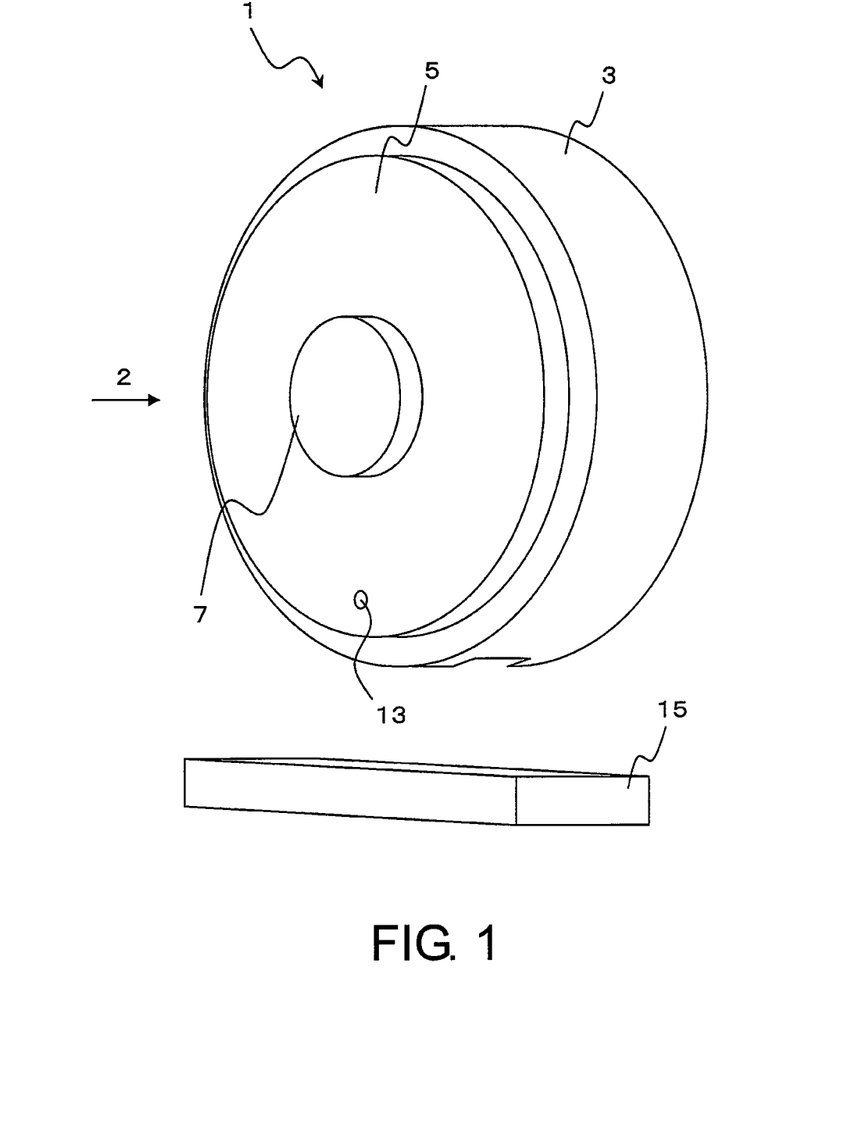
FIG. 1 is a perspective view of a film bonding apparatus 1.
Figure 2:
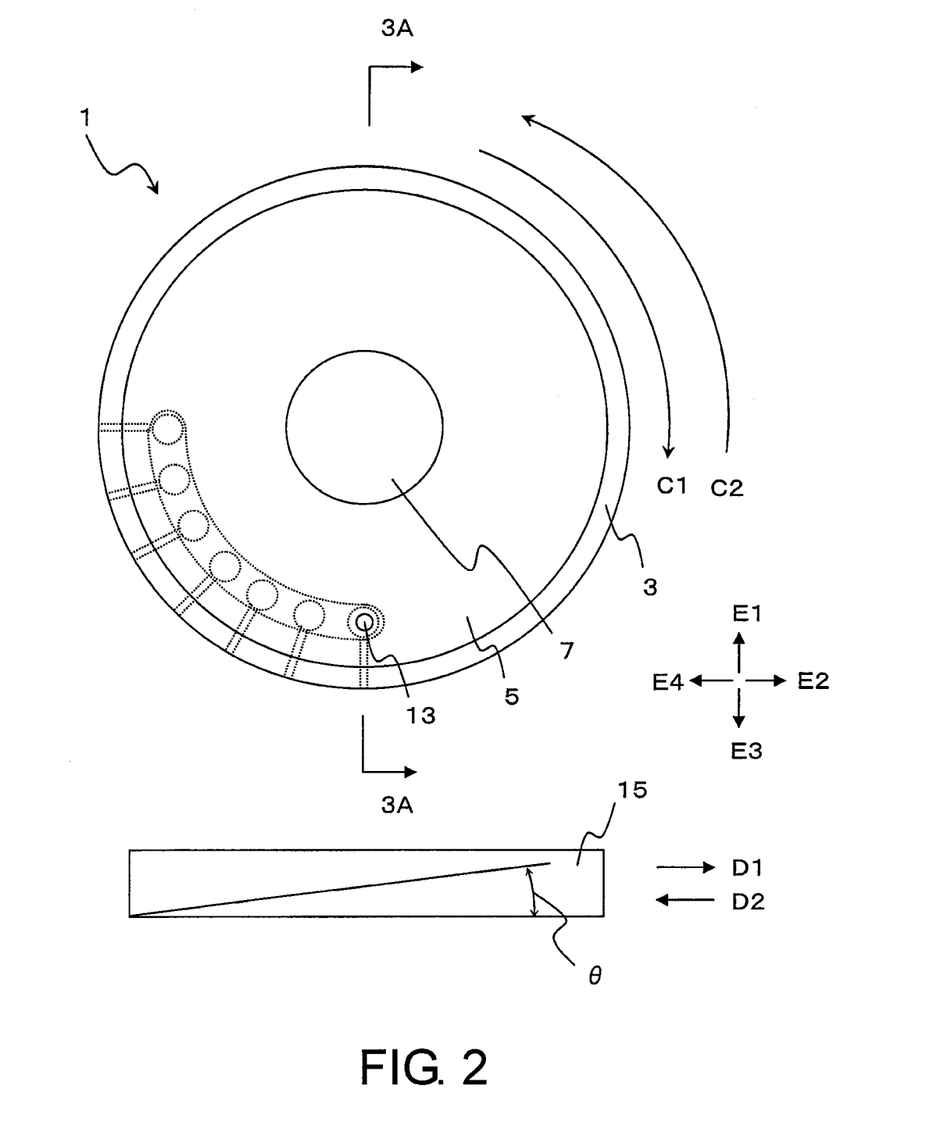
FIG. 2 is a diagram as viewed along direction 2 of FIG. 1.
Figure 3A:
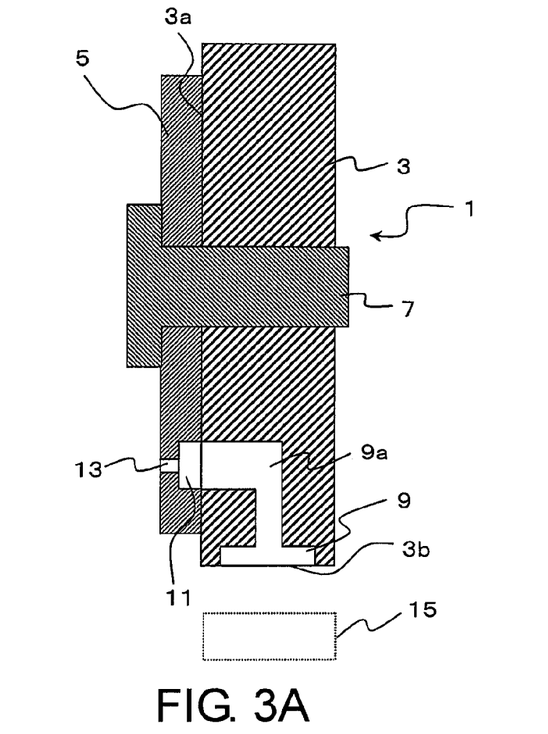
FIG. 3A is a cross-sectional view taken along line 3A-3A of FIG. 2.

The material of the bonding head 3 is not limited to a specific one. Nevertheless, at least a portion contacting the film 17 is preferably formed of a material comprising elasticity, more preferably rubber or resin comprising a hardness of 20 to 40 by the standard SRIS 0101.

If the bonding head 3 is formed of such a material, bonding pressures are equally generated when the film 17 is bonded onto the glass substrate 19. Therefore, the glass is prevented from being broken because of local concentration of the bonding pressures, and the thickness of the glass substrate 19 can thus be reduced.

Furthermore, since the bonding pressures are equally generated, air bubbles are prevented from being mixed on a bonding surface at the time of bonding. Therefore, low-grade glass comprising poor flatness can be used as a material for the glass substrate 19.

The disk-like base member 5 is provided as a second member on an end face 3a (side surface) of the bonding head 3.

The base member 5 may be provided on other surfaces, not on the side surface of the bonding head 3.

A structure for preventing leakage of air at the time of pressure reduction, which will be described later, is provided between the bonding head 3 and the base member 5. In order to improve the airtightness and control leakage of air, a seal, which is not shown, may be provided as needed.

The film bonding apparatus 1 further includes the shaft 7 provided at the center of axes of the bonding head 3 and the base member 5.

The bonding head 3 is rotatable about the shaft 7 in directions C1 and C2 of FIG. 2.

On the other hand, the base member 5 does not rotate.

Furthermore, the bonding head 3, the base member 5, and the shaft 7 can be moved jointly in directions E1, E2, E3, and E4 of FIG. 2 by an actuator, which is not shown.

Moreover, the flat bonding surface plate 15 for holding a bonding object is provided so as to face a surface 3b of the bonding head 3.

The bonding surface plate 15 is movable in directions D1 and D2 of FIG. 2. The bonding surface plate 15 may be movable in a vertical direction of FIG. 2 or in a θ-direction (a direction for adjusting the horizontally of the bonding surface plate 15).

The material of the bonding surface plate 15 is not limited to a specific one. Nevertheless, the bonding surface plate 15 is preferably formed of a material comprising elasticity, more preferably rubber or resin comprising a hardness of 20 to 40 by the standard SRIS 0101, as with the bonding head 3.

If the bonding surface plate 15 is formed of such a material, it is possible to attain the same advantages as in the case where the bonding head 3 is formed of such a material.

Next, the detailed structures of the bonding head 3 and the base member 5 will be described with reference to FIGS. 3A to 5B.

Figure 4:
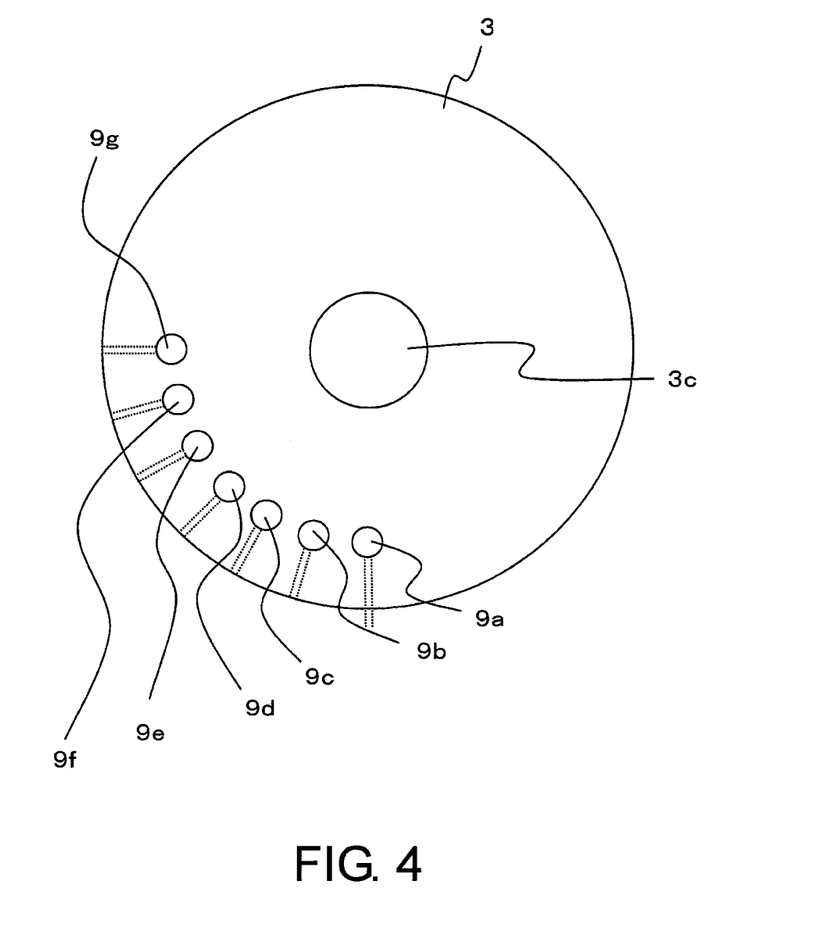
FIG. 4 is a side view showing a bonding head 3.

As shown in FIGS. 3A and 4, suction holes 9a, 9b, 9c, 9d, 9e, 9f, and 9g are formed in the surface 3b of the bonding head 3.

The suction holes 9a, 9b, 9c, 9d, 9e, 9f, and 9g extend through the bonding head 3 from the end face 3a (side surface) to the surface 3b. In FIGS. 3A and 4, a portion of the suction hole extending to the surface 3b is illustrated as a suction portion 9 comprising a widened shape. However, the shape of the suction portion 9 can be selected properly depending upon the film.

Figure 3B:
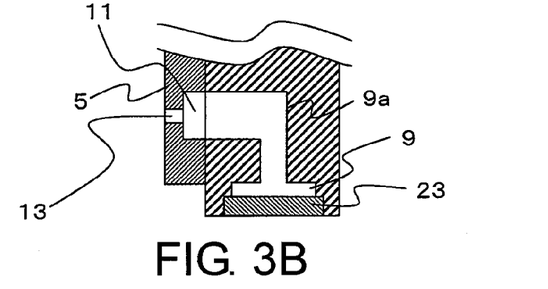
FIG. 3B is a view showing a variation of FIG. 3A.

Furthermore, as shown in FIG. 3B, a piece 23 formed of a porous sheet of metal, resin, sponge, or the like may be provided in the suction portion 9.

Provision of the piece 23 formed of a porous sheet or the like can prevent a mark of the hole from being transferred to the film 17 at the time of attraction of the film, which will be described later.

For example, the piece 23 comprises a hole density such that holes comprising a diameter of 1 mm are formed at a pitch of 2 mm.

Meanwhile, the suction holes 9a, 9b, 9c, 9d, 9e, 9f, and 9g (on the surface of the end face 3a from which they extend) are arranged (in an arcuate manner) so as to correspond to the shape of a groove 11, which will be described later.

Furthermore, a head shaft hole 3c through which the shaft 7 passes is formed at the center of the bonding head 3.

Figure 5A:
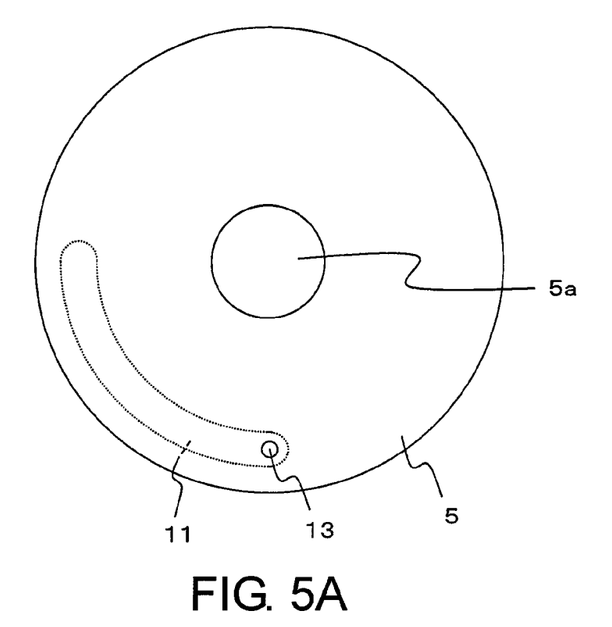
FIG. 5A is a side view showing a base member 5.
Figure 5B:
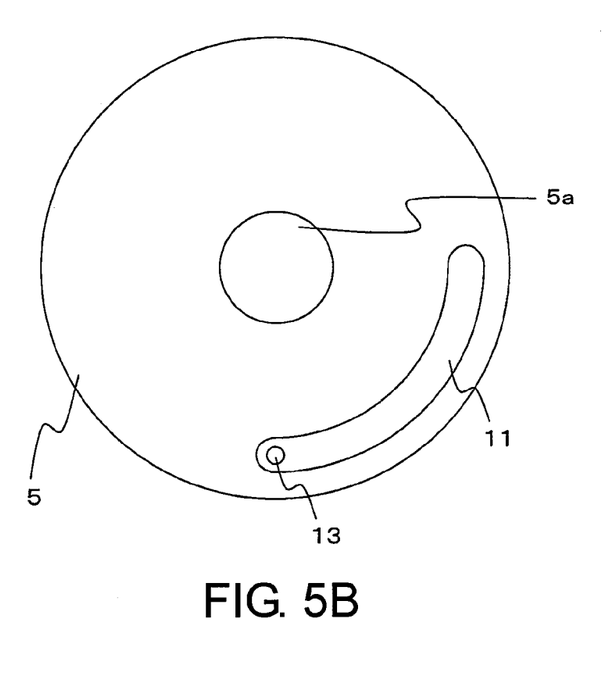
FIG. 5B is a rear view of FIG. 5A.

As shown in FIGS. 3A, 5A, and 5B, the base member 5 comprises a groove 11 formed in a surface facing the bonding head 3.

The groove 11 comprises a shape corresponding to the shape of the surface 3b of the bonding head 3, i.e., an arcuate shape.

Furthermore, the base member 5 comprises a hole 13 extending through the base member 5 from the groove 11 to a surface of the base member 5 opposite to the surface facing the bonding head 3.

Figure 3C:
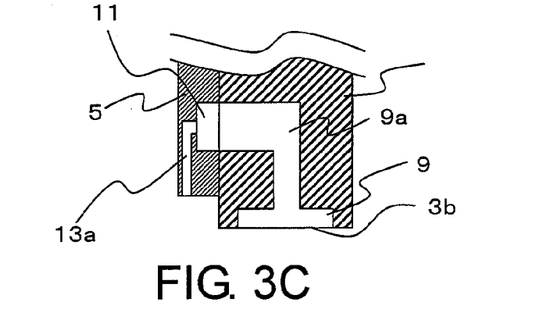
FIG. 3C is a view showing a variation of FIG. 3A.

As shown in FIG. 3C, a hole 13a may be formed so as to extend to a side surface of the base member 5.

A decompression source such as a vacuum pump, which is not shown, is connected to the hole 13.

The position of the hole 13 can be selected properly based on a positional relationship with the decompression source.

Furthermore, a base shaft hole 5a through which the shaft 7 passes is formed at the center of the base member 5.

Here, as shown in FIG. 3A, when the groove 11 communicates with the suction hole 9a, the hole 13 is connected to the suction hole 9a through the groove 11, so that the suction hole 9a is connected to the decompression source.

If the decompression source is operated in this state, air in the suction hole 9a is exhausted so that the suction portion 9 can attract a film.

Meanwhile, when the bonding head 3 is rotated in the direction C1 or C2 of FIG. 2 from the state of FIG. 3A so as to move the groove 11 to a position at which the groove 11 does not communicate with the suction hole 9a, the communication between the hole 13 and the suction hole 9a is disconnected. Thus, the communication between the suction hole 9a and the decompression source is disconnected.

In this state, air in the suction hole 9a is not exhausted. Therefore, the suction portion 9 cannot attract a film. Accordingly, if the suction portion 9 has already attracted a film, the film is separated from the suction hole 9a.

The suction holes 9b, 9c, 9d, 9e, 9f, and 9g are configured in the same manner as the suction hole 9a.

Thus, in the film bonding apparatus 1, a desired number of the suction holes among the suction holes 9a, 9b, 9c, 9d, 9e, 9f, and 9g are connected to or disconnected from the decompression source by relative positions between the groove 11 and the suction holes 9a, 9b, 9c, 9d, 9e, 9f, and 9g.

Specifically, the groove 11 of the base member 5 connects suction holes, the number of which corresponds to relative positions between the groove 11 and the suction holes 9a, 9b, 9c, 9d, 9e, 9f, and 9g, to the decompression source.

Next, a method bonding the film 17 onto the glass substrate 19 with use of the film bonding apparatus 1 will be described with reference to FIGS. 6 to 11.

Bonding of the film 17 onto the glass substrate 19 with the film bonding apparatus 1 requires a process of attracting the film 17 to the bonding head 3 and a process of bonding the film 17 on the bonding head 3 to the glass substrate 19.

First, the process of attracting the film 17 to the bonding head 3 will be described with reference to FIGS. 6 to 8.

The film 17 is first placed on the bonding surface plate 15 and held in a flat state.

The film 17 has been bonded to a mount 19a. An adhesive layer, which is not shown, is provided on a surface of the film 17 that contacts the mount 19a.

Available known member can be used holding the film 17. For example, the film 17 is held by vacuum suction or a clamp.

Then the bonding head 3 is rotated relative to the base member 5 in the direction C1 or C2 of FIG. 2. As shown in FIG. 6, the bonding head 3 is positioned so that the groove 11 communicates only with the suction hole 9g.

In this state, the bonding head 3 (along with the base member 5 and the shaft 7) is moved in the direction E2, E3, or E4 of FIG. 2 so as to bring the suction hole 9g into contact with a surface of a left edge of the film 17. Then the decompression source, which is not shown, is operated.

During the movement, the position of the edge of the film 17 is measured by a sensor, a camera, or the like, which is not shown. Based on the measured position, an actuator, which is not shown, is operated to move the bonding head 3 (along with the base member 5 and the shaft 7).

The bonding surface plate 15, rather than the bonding head 3, may be moved to bring the suction hole 9g into contact with the surface of the left edge of the film 17.

Since the groove 11 communicates only with the suction hole 9g, only air in the suction hole 9g is exhausted. Thus, the surface of the edge of the film 17 is attracted to the surface 3b of the bonding head 3.

The suction force depends upon the surface roughness and the flexibility of the film 17. In the case of a polarization film for a liquid crystal panel as in the present embodiment, it is preferable to adjust a suction force in a range of about $2.0 \times 10^4$ Pa to about $4.9 \times 10^4$ Pa.

Figure 6:
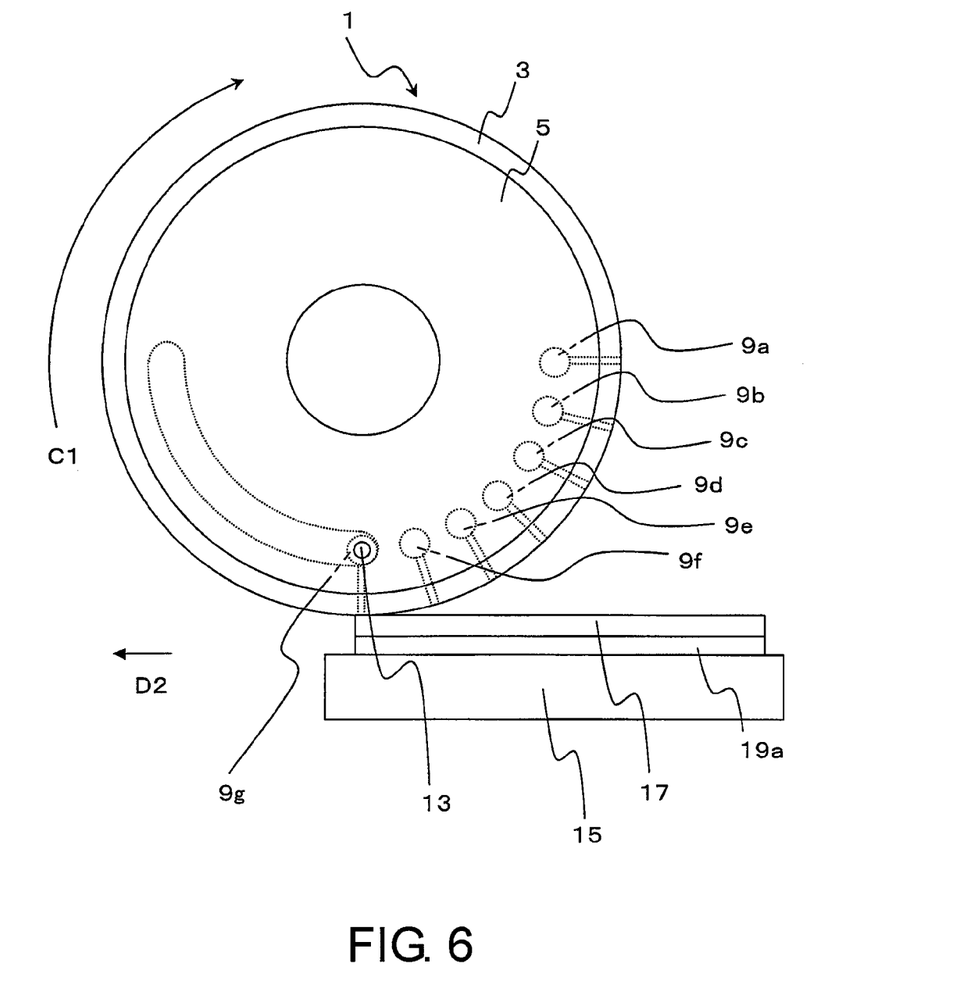
FIG. 6 is a view showing a method attracting a film 17 to the bonding head 3 with use of the film bonding apparatus 1.

Next, the bonding head 3 is rotated from the state of FIG. 6 in the direction C1 of FIG. 6. Furthermore, the bonding surface plate 15 is moved toward the direction D2 of FIG. 6 in synchronism with the rotation of the bonding head 3.

The suction holes 9f, 9e, 9d, 9c, 9b, and 9a are brought into contact with the film 17 in the order named. The suction holes communicate with the groove 11 and are connected to the decompression source in the order in which they have been brought into contact with the film 17. Sequentially, air is exhausted, so that the suction holes attract the film 17.

In other words, the film bonding apparatus 1 attracts the film 17 merely by bringing the bonding head 3 into contact with the film 17 and rotating the bonding head 3.

Figure 7:
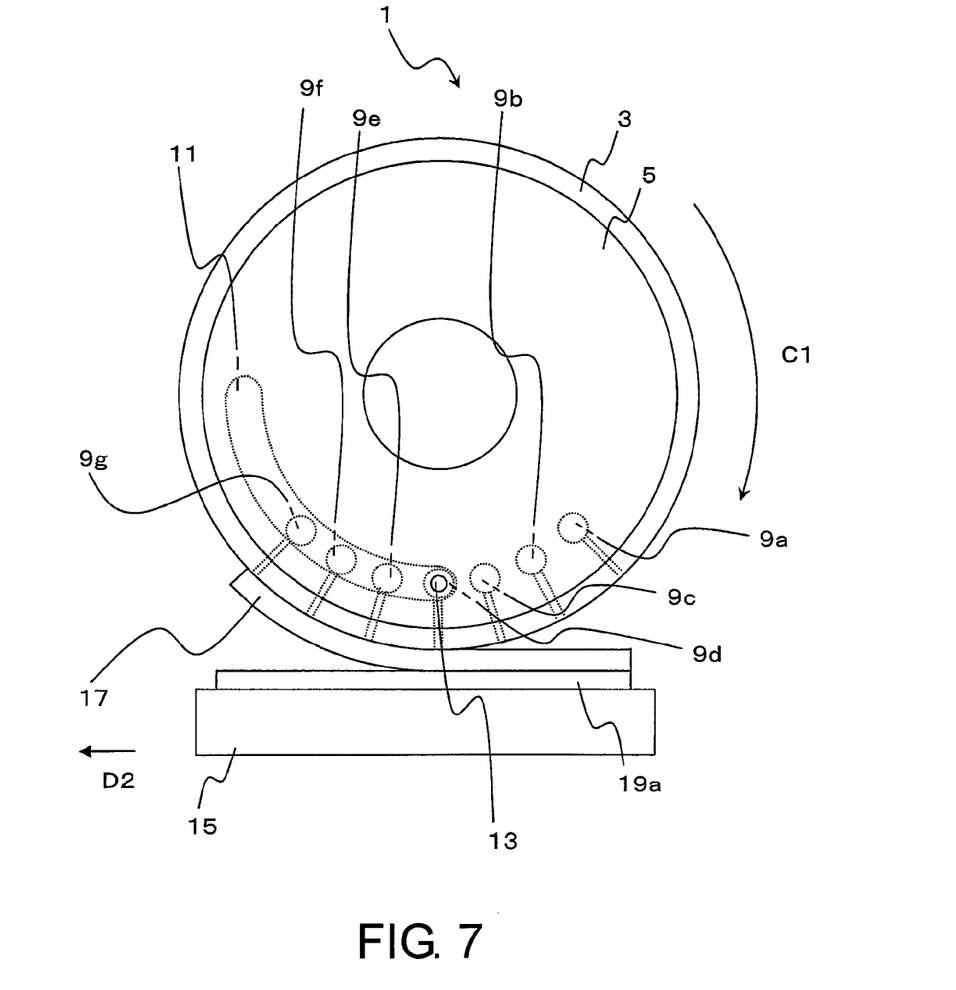
FIG. 7 is a view showing a method attracting the film 17 to the bonding head 3 with use of the film bonding apparatus 1.

For example, FIG. 7 shows the attraction in progress. The suction holes 9g, 9f, 9e, and 9d communicate with the groove 11 and are connected to the decompression source. Air in the suction holes 9g, 9f, 9e, and 9d is drawn, so that the suction holes 9g, 9f, 9e, and 9d attract the film 17.

Those suction holes have been brought into contact with the film 17. Those suction holes communicate with the groove 11 in the order in which they have been brought into contact with the film 17. Thus, the suction holes 9g, 9f, 9e, and 9d attract the film 17.

Figure 8:
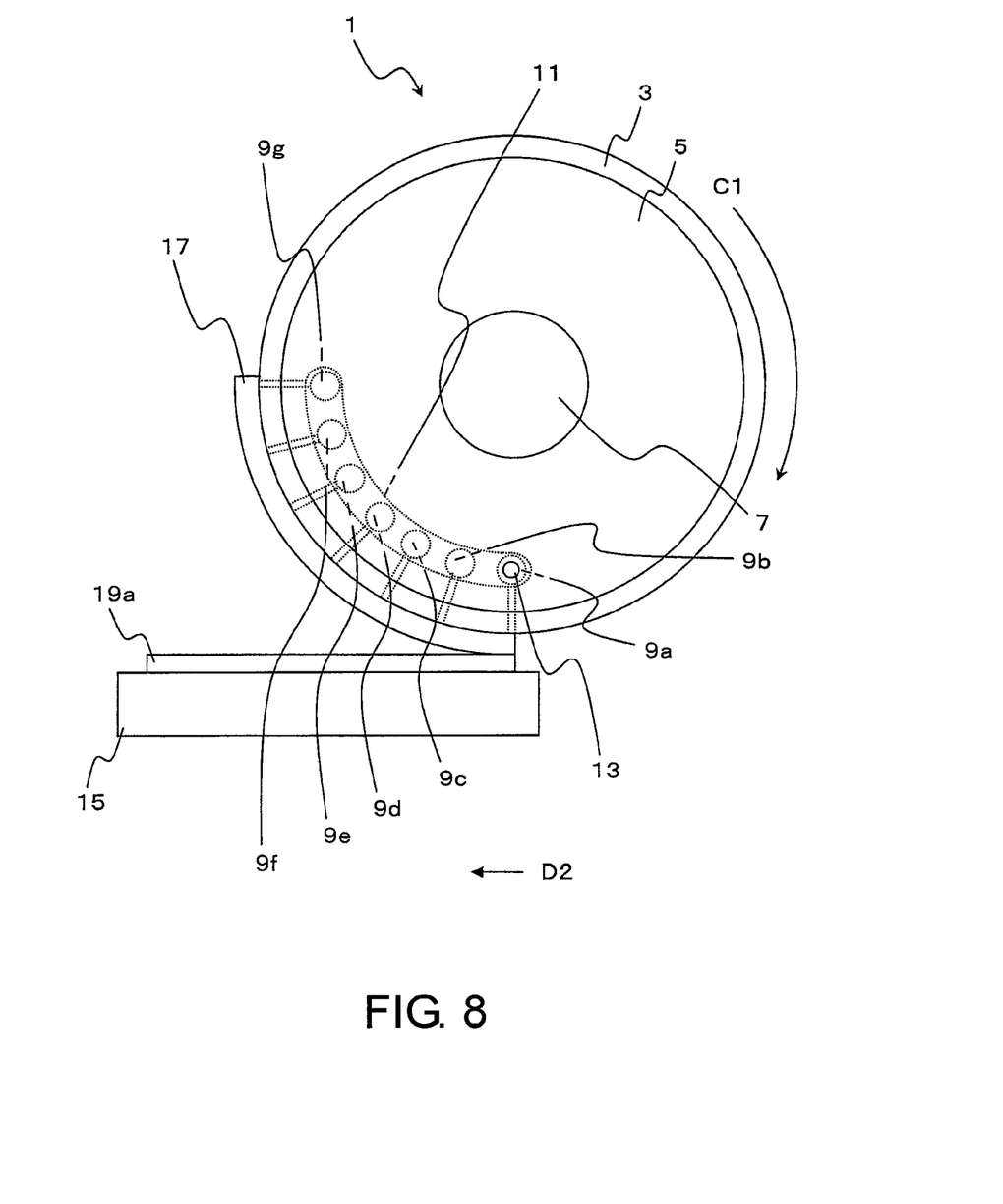
FIG. 8 is a view showing a method attracting the film 17 to the bonding head 3 with use of the film bonding apparatus 1.

As shown in FIG. 8, when all of the suction holes communicate with the groove 11, the bonding head 3 (along with the base member 5 and the shaft 7) is moved toward the direction E1 of FIG. 2 and separated from the bonding surface plate 15.

In order to thus attract the film 17 with the film bonding apparatus 1, relative positions between the suction holes and the groove 11 are arranged such that the suction holes communicate with the groove 11 and are connected to the decompression source for attracting the film 17 in the order in which they have been brought into contact with the film 17.

With such an arrangement, the film 17 can be attracted to the bonding head 3 with accuracy without deviation at the time of the attraction.

In the above process, the film 17 is peeled from the mount 19a at the same time it is attracted. However, the film 17 may be attracted together with the mount 19a, and the mount 19a may be peeled later.

Furthermore, in the above process, the bonding surface plate 15 holds the film 17 to be attracted. However, the film 17 to be attracted may be held on a surface plate other than the bonding surface plate 15.

Next, a process of bonding the attracted film 17 onto the glass substrate 19 will be described with reference to FIGS. 9 to 11.

Figure 9:
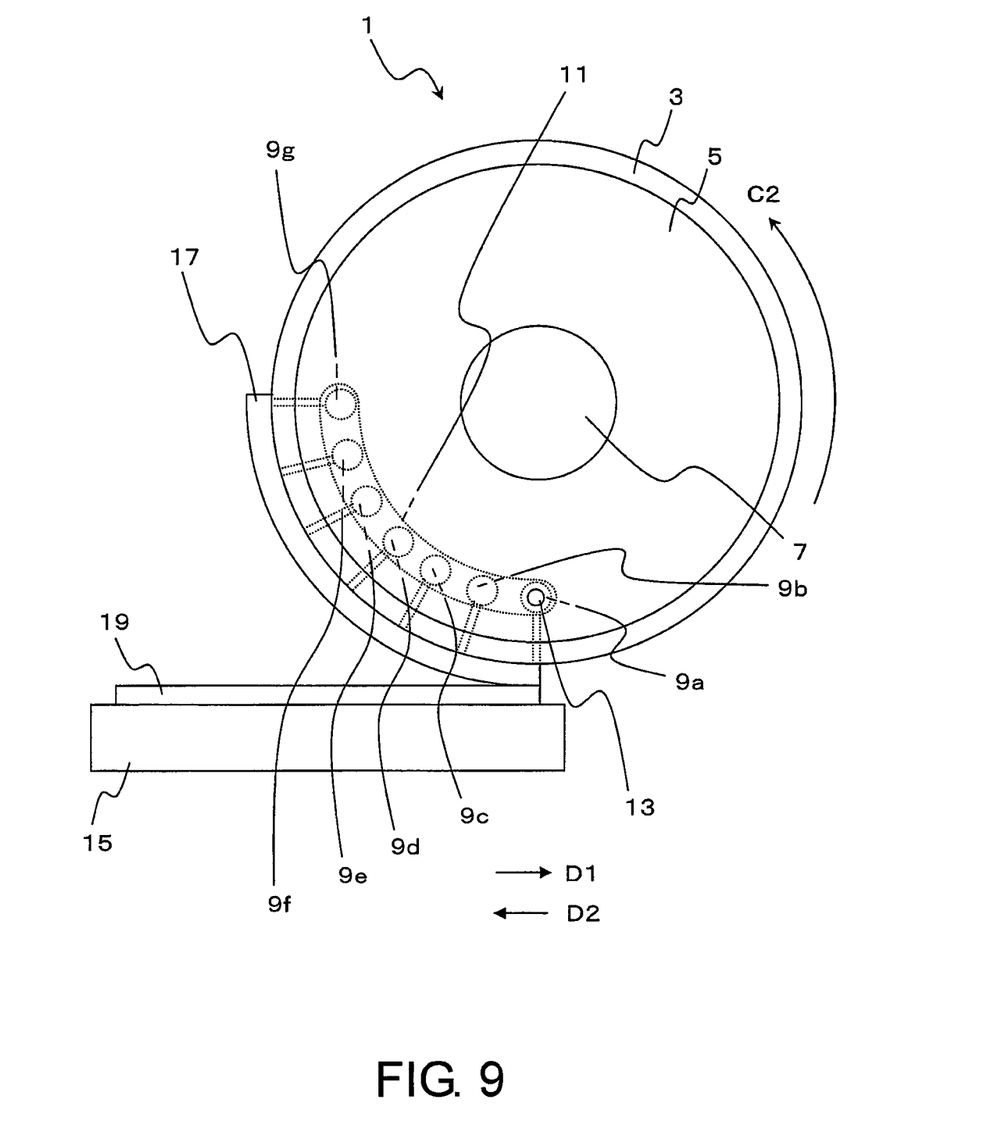
FIG. 9 is a view showing a method bonding the film 17 onto a glass substrate 19 with use of the film bonding apparatus 1.

First, as shown in FIG. 9, the glass substrate 19 is held on the bonding surface plate 15. The same holding members holding the film 17 may be used.

For the bonding surface plate 15, a common bonding surface plate may be used both holding the film 17 when the bonding head 3 attracts the film 17 and for holding the glass substrate 19 as described here. Alternatively, separate bonding surface plates may be used.

Next, the bonding head 3 (along with the base member 5 and the shaft 7) that has attracted the film 17 is moved in the directions E2, E3, and E4 of FIG. 2 so that the suction hole 9a is brought into contact with a surface of the glass substrate 19 at a desired bonding location.

During the movement, the position of the edge of the glass substrate 19 is measured by a sensor, a camera, or the like, which is not shown. Based on the measured position, an actuator, which is not shown, is operated to move the bonding head 3 (along with the base member 5 and the shaft 7).

The bonding surface plate 15, rather than the bonding head 3, may be moved to bring the suction hole 9a into contact with the desired bonding location of the glass substrate 19.

Then the bonding head 3 is rotated in the direction C2. Furthermore, the bonding surface plate 15 is moved toward the direction D1 of FIG. 9 in synchronism with the rotation of the bonding head 3.

The suction holes 9b, 9c, 9d, 9e, 9f, and 9g are brought into contact with the glass substrate 19 via the film 17 in the order named. The communications of the suction holes 9b, 9c, 9d, 9e, 9f, and 9g with the groove 11 are cut off in that order.

In other words, the communications of the suction holes with the groove 11 are cut off in the order in which the suction holes have been brought into contact with the glass substrate 19. The suction holes are disconnected from the decompression source, losing a suction force. Therefore, the suction holes are separated from the film 17.

Accordingly, the film 17 is bonded to the glass substrate 19 from a portion separated from the suction holes by release of the attraction.

Figure 10:
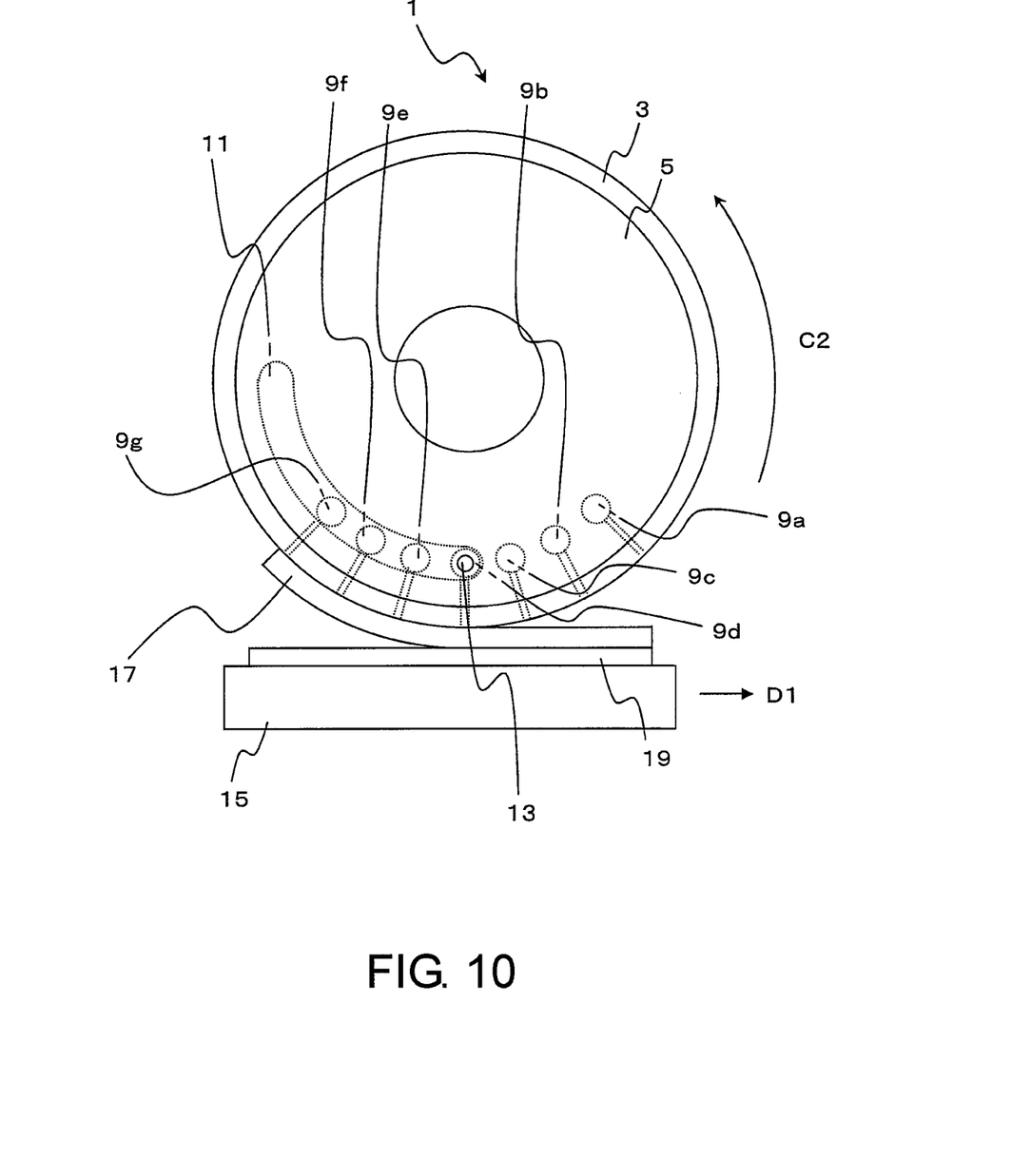
FIG. 10 is a view showing a method bonding the film 17 onto the glass substrate 19 with use of the film bonding apparatus 1.

For example, FIG. 10 shows the bonding in progress. The suction holes 9g, 9f, 9e, and 9d communicate with the groove 11 and are connected to the decompression source. Air in the suction holes 9g, 9f, 9e, and 9d is drawn, so that the suction holes 9g, 9f, 9e, and 9d attract the film 17.

Those suction holes have not been brought into contact with the glass substrate 19 via the film 17. The communications of those suction holes with the groove 11 are cut off so that the suction holes lose a suction force to the film 17 in the order in which the suction holes have been brought into contact with the glass substrate 19.

A suction force prior to the cut-off is maintained immediately after the communication has been cut off. Therefore, the film 17 is held on the bonding head 3 until it is bonded.

Figure 11:
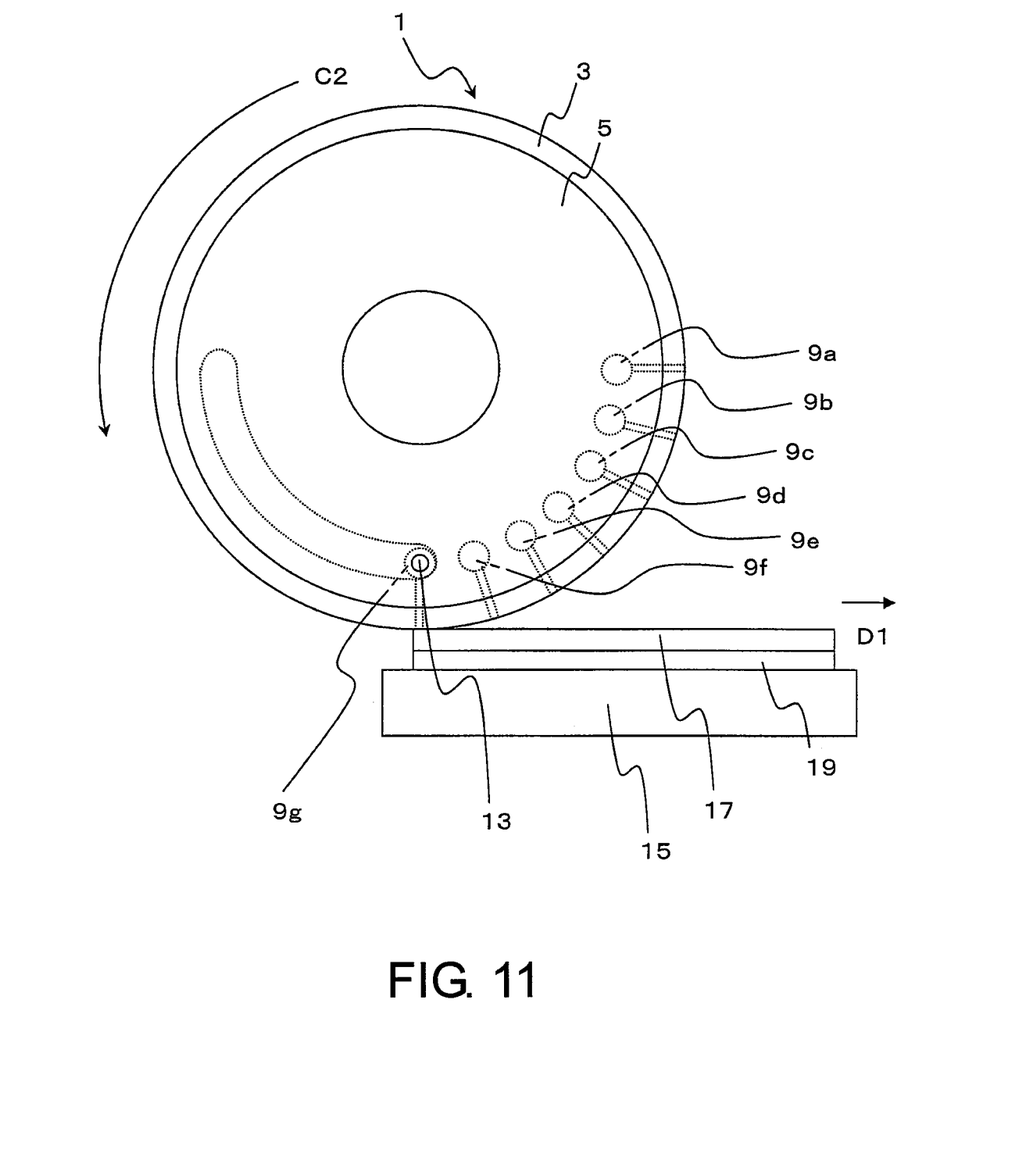
FIG. 11 is a view showing a method bonding the film 17 onto the glass substrate 19 with use of the film bonding apparatus 1.

As shown in FIG. 11, when the bonding of the film 17 is completed, the rotation of the bonding head 3 and the suction of the decompression source are stopped.

Then the bonding head 3 (along with the base member 5 and shaft 7) is moved upward in FIG. 2 and separated from the bonding surface plate 15.

Thus, the film 17 is bonded to the glass substrate 19, and a liquid crystal panel is completed.

Figure 12:
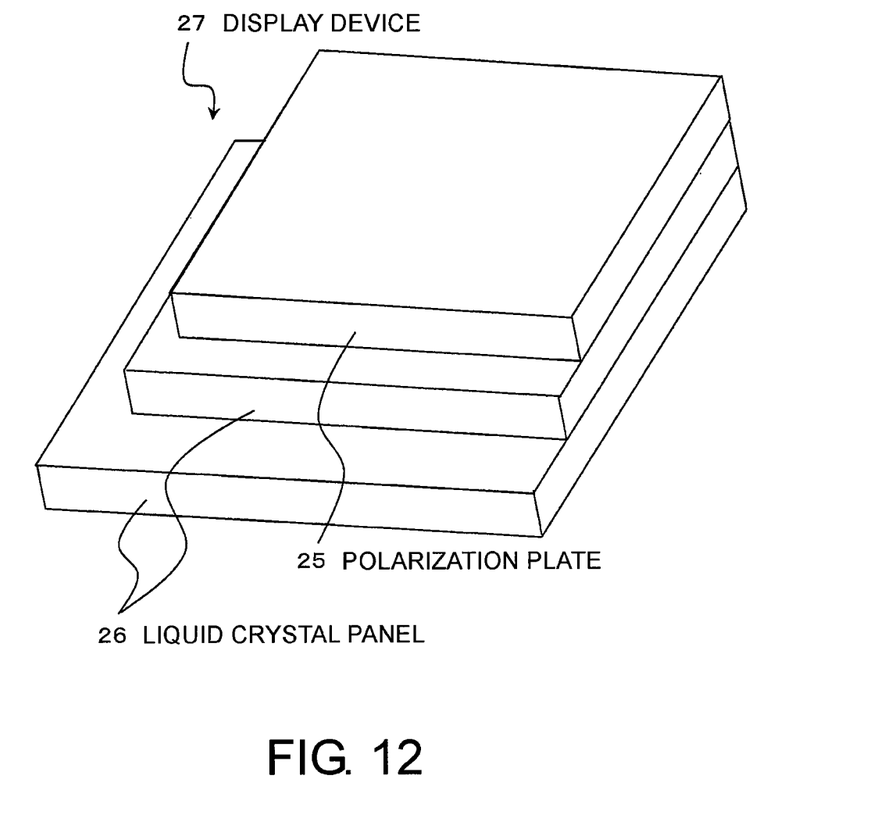
FIG. 12 is a view showing a display apparatus 27 manufactured by bonding a polarization plate 25 to liquid crystal panels 26 with use of the film bonding apparatus 1.

For reference purposes, FIG. 12 shows a display apparatus 27 manufactured by bonding a polarization plate to liquid crystal panels with use of the film bonding apparatus 1.

In the display apparatus 27 shown in FIG. 12, a polarization plate 25 is bonded to liquid crystal panels 26 with use of the film bonding apparatus 1.

As described above, when the film 17 is bonded to the glass substrate 19, the communications of the suction holes with the groove 11 are cut off in the order in which the suction holes have been brought into contact with the glass substrate 19 via the film 17. Thus, the suction holes are separated from the film 17. Specifically, the communications are cut off at (or near) a portion at which the film 17 is brought into contact with the glass substrate.

Therefore, deviation of the film 17 or mixing of air or dust is prevented during the bonding. Accordingly, the film 17 can be bonded with accuracy.

Thus, according to the present embodiment, the film bonding apparatus 1 includes a bonding head 3 comprising a plurality of suction holes and a base member 5 comprising a groove 11. The individual suction holes are connected to or disconnected from a decompression source by relative positions between the groove 11 and the individual suction holes.

Therefore, the film bonding apparatus 1 does not require a plurality of valves for suction control. Thus, the film bonding apparatus 1 comprises a simple structure.

Furthermore, no air needs to be blown. Therefore, deviation of the film 17 or mixing of air or dust is prevented during the bonding. Accordingly, the film 17 can be bonded with accuracy.

Moreover, when the film bonding apparatus 1 is used to bond the film 17 onto the glass substrate 19 for manufacturing a display apparatus, the quality of the manufactured display apparatus can be improved.

EXAMPLE

The present invention will specifically be described below based on an example.

In an example of the present invention, a film bonding apparatus 1 shown in FIG. 1 was prepared. A polarization film was bonded to a glass substrate 19 comprising a diagonal of 2 inches to 60 inches.

The polarization film used for bonding had a surface roughness such that $0.3\ \mu m \leq Ra \leq 3.0\ \mu m$. The thickness of the polarization film was in a range of from 0.1 mm to 0.5 mm.

Furthermore, a suction force of each suction hole at the time of bonding was set in a range of from about $2.0 \times 10^4$ Pa to about $4.9 \times 10^4$ Pa.

As a result, it was confirmed that the polarization film did not fall off from the bonding head 3 during the bonding and that there is no trouble in the slide of the polarization film at the time of the bonding.

In the aforementioned embodiment, the present invention is applied to an apparatus for bonding a polarization film to a liquid crystal display substrate. However, the present invention is not limited to that example and is applicable to any apparatus for bonding a film to a bonding object.

Furthermore, in the above embodiment, the base member 5 is not rotated while the bonding head 3 is rotated. Conversely, the base member 5 may be rotated.

Moreover, the bonding head 3 comprises a cylindrical shape in the above embodiment. However, the shape of the bonding head 3 is not limited to a cylindrical shape. The bonding head 3 may comprise any shape as long as a surface with suction holes comprises a curved shape.

Furthermore, according to another embodiment of the vacuum suction control mechanism apparatus of the present invention, the surface of the first member may comprise a curved shape, the second member may include a groove provided on a surface of the second member facing the first member, the groove may comprise a shape corresponding to the curved shape, the second member may comprise a hole extending through the second member from the groove to an exterior of the second member, the hole may be connected to the decompression source, the plurality of suction holes may be arranged to comprise an arrangement shape corresponding to the shape of the groove, the first member or the second member may be movable along a curved surface of the curved shape, and the groove of the second member may be moved relative to the first member so that the suction holes that communicate with the groove are connected to the decompression source by movement of the first member or the second member.

According to still another embodiment of the vacuum suction control mechanism apparatus of the present invention, the first member may comprise a cylindrical shape, the groove may comprise an arcuate shape, the plurality of suction holes may be arranged in an arcuate manner, the first member or the second member may be rotatable about an axis of the cylinder, and the groove of the second member may be moved relative to the first member so that the suction holes that communicate with the groove are connected to the decompression source by rotation of the first member or the second member about the axis of the cylinder.

According to another embodiment of the vacuum suction control mechanism apparatus of the present invention, the plurality of suction holes may extend through the first member from a side surface to a surface of the first member.

According to still another embodiment of the vacuum suction control mechanism apparatus of the present invention, the first member may comprise a bonding head configured to hold a film, and the second member may comprise a base member provided on a side surface of the bonding head.

According to another embodiment of the vacuum suction control mechanism apparatus of the present invention, the decompression source comprises a vacuum pump, for example.

According to still another embodiment of the vacuum suction control mechanism apparatus of the present invention, the vacuum suction control mechanism apparatus may further comprise a bonding surface plate configured to hold a bonding object, and the bonding surface plate may be provided so as to face the surface of the first member.

According to another embodiment of the vacuum suction control mechanism apparatus of the present invention, the first member and/or the bonding surface plate may comprise elasticity Furthermore, according to another embodiment of the film bonding apparatus of the present invention, the vacuum suction control mechanism apparatus may be an apparatus for attracting and bonding an optical film.

Moreover, according to still another embodiment of the film bonding apparatus of the present invention, the bonding surface plate may comprise holding member holding the bonding object in a flat state.

Furthermore, according to another embodiment of the display apparatus of the present invention, the film may comprise flexibility.

Moreover, according to still another embodiment of the display apparatus of the present invention, the film may be an optical film, and the bonding object may be a substrate that allows visible light to pass therethrough.

Furthermore, according to another embodiment of the display apparatus of the present invention, the optical film may be a polarization film or a retardation film.

Moreover, according to still another embodiment of the display apparatus of the present invention, the film may be a protective film.

Furthermore, according to another embodiment of the display apparatus of the present invention, the bonding object may be formed of glass.

In a vacuum suction control mechanism apparatus and a film bonding method according to an embodiment of the present invention, the vacuum suction control mechanism apparatus comprises a first member comprising suction holes and a second member for connecting the suction holes to a decompression source, and the second member connects some of the suction holes, the number of which corresponds to a relative position between the first member and the second member, to the decompression source.

Accordingly, at the time of bonding of a film, attraction can sequentially be released at a portion that has been bonded. Thus, a film can accurately be bonded to a bonding object with a simple structure without deviation of the film or mixing of dust or air.

Furthermore, since a display apparatus according to an embodiment of the present invention is manufactured by using a film bonding method according to an embodiment of the present invention, the quality of the display apparatus can be improved.

This application claims the benefit of priority from Japanese patent application No. 2007-228892, filed on Sep. 4, 2007, the disclosure of which is incorporated herein in its entirety by reference.

The invention claimed is:

1. A vacuum suction control mechanism comprising:
   a first member comprising a curved shape surface, an end face, and a plurality of suction holes which attract a film, the suction holes extending through from the end face to the curved shape surface, the plurality of suction holes being connectable to one decompression source; and
   a second member provided directly on the end face of the first member capable of contacting the plurality of suction holes which comprise pieces formed of a porous sheet provided within the suction holes, the second member being movable relative to the first member,
   wherein the second member includes a groove facing the end face of the first member, the groove comprising a shape corresponding to the curved shape, connecting some of the suction holes, the number of which suction holes corresponds to a relative position between the first member and the second member, to the decompression source via a hole extending through the second member from the groove to an exterior of the second member, the hole extending through the second member from the groove to an exterior of the second member being connected to the decompression source,
   wherein the groove of the second member is movable relative to the first member so that the suction holes that communicate with the groove are connected to the decompression source,
   wherein the first and second member can be moved in the direction of the curved shape and with respect to the film, and
   wherein air blow is not used for attracting the film.

2. The vacuum suction control mechanism apparatus as recited in claim 1, wherein:
   the first member has a cylindrical shape,
   the groove has an arcuate shape,
   the plurality of suction holes are arranged in an arcuate manner,
   the first member or the second member is rotatable about an axis of the cylinder, and
   the groove of the second member is moved relative to the first member so that the suction holes that communicate with the groove are connected to the decompression source.

3. The vacuum suction control mechanism apparatus as recited in claim 1, wherein the decompression source comprises a vacuum pump.

4. The vacuum suction control mechanism apparatus as recited in claim 2, further comprising a bonding surface plate configured to hold a bonding object, the bonding surface plate being provided so as to face the surface of the first member.

5. The vacuum suction control mechanism apparatus as recited in claim 4, wherein the first member and/or the bonding surface plate has elasticity.

6. A film bonding apparatus comprising the vacuum suction control mechanism apparatus as recited in claim 1.

7. The film bonding apparatus as recited in claim 6, wherein,
   the vacuum suction control mechanism apparatus is an apparatus attracting and bonding an optical film, and further comprising a bonding surface plate which comprises a holding portion holding a bonding object in a flat state.

8. A film bonding apparatus comprising the vacuum suction control mechanism apparatus as recited in claim 2.

9. A vacuum suction control mechanism comprising:
a first member comprised of a cylindrical bonding head (3) for attracting a film (17) free of the use of air blow, the first member comprising a curved shape surface along which the film (17) is attracted, an end face (3*a*), and a plurality of suction holes (9*a*) which attract the film, the suction holes extending through from the end face to the curved shape surface, the plurality of suction holes being connectable to a single decompression source, the suction holes each comprising a porous sheet (23) provided within the suction hole along the curved shape surface;
a second member comprised of a base member (5) directly on—the end face (3*a*) of the bonding head (3) adjacent and facing the end face (3*a*) of the bonding head (3), the base member including a groove (11) provided on a surface facing the bonding head (3), the second member arranged for contacting the plurality of suction holes by the second member being movable relative to the first member, the base member (5) comprising a hole (13) extending through the base member (5) from the groove (11) to a surface of the base member (5) opposite to the surface facing the bonding head (3), the hole (13) being connected to the decompression source;
a shaft (7) provided at a center of axes of the bonding head (3) and the base member (5), where the bonding head (3) is rotatable about the shaft (7); and
a bonding surface plate (15);
wherein the groove comprises a shape corresponding to the curved shape of the first member, the groove selectively connecting some of the suction holes to the decompression source, where the number of the connected suction holes corresponds to a relative position between the first member and the second member, the groove of the second member being moved relative to the first member so that the suction holes that communicate with the groove are connected to the decompression source, and
wherein the first and second member can be moved in the direction of the curved shape and with respect to the film.

10. The vacuum suction control mechanism apparatus as recited in claim 1, wherein, first and second members are movable relative to each other so that none of the suction holes of the first member are in communication, via the groove and the hole extending through the second member from the groove to an exterior of the second member, with the decompression source.

11. The vacuum suction control mechanism apparatus as recited in claim 9, wherein, first and second members are movable relative to each other so that none of the suction holes of the first member are in communication, via the groove and the hole extending through the second member from the groove to an exterior of the second member, with the decompression source.

\* \* \* \* \*